(12) United States Patent
Carnevali

(10) Patent No.: US 8,157,310 B2
(45) Date of Patent: Apr. 17, 2012

(54) MODULAR CONSOLE SYSTEM

(76) Inventor: Jeffrey D. Carnevali, Seattle, WA (US)

( * ) Notice: Subject to any disclaimer, the term of this patent is extended or adjusted under 35 U.S.C. 154(b) by 126 days.

(21) Appl. No.: 12/386,124

(22) Filed: Apr. 13, 2009

(65) Prior Publication Data

US 2010/0090490 A1 Apr. 15, 2010

Related U.S. Application Data

(63) Continuation-in-part of application No. 12/287,622, filed on Oct. 10, 2008, now Pat. No. 7,802,832.

(51) Int. Cl.
*B60N 3/00* (2006.01)
(52) U.S. Cl. .................. 296/24.34; 296/37.8; 296/70
(58) Field of Classification Search .............. 296/24.34, 296/37.8, 70; 351/829
See application file for complete search history.

(56) References Cited

U.S. PATENT DOCUMENTS

| | | | |
|---|---|---|---|
| 1,417,401 A * | 5/1922 | Mahoney | 312/297 |
| D218,438 S | 8/1970 | Shook et al. | |
| 3,550,001 A | 12/1970 | Hanley | |
| 3,583,780 A * | 6/1971 | Berkowitz | 312/108 |
| 3,984,161 A * | 10/1976 | Johnson | 312/7.1 |
| 4,313,646 A * | 2/1982 | Millhimes et al. | 439/654 |
| D279,329 S | 6/1985 | Dzak | |
| 4,733,900 A | 3/1988 | Fluharty | |
| 4,846,382 A | 7/1989 | Foultner et al. | |
| 5,005,898 A | 4/1991 | Benedetto et al. | |
| 5,174,621 A * | 12/1992 | Anderson | 296/70 |
| 5,181,555 A | 1/1993 | Chruniak | |
| 5,199,772 A * | 4/1993 | Jordan | 312/7.1 |
| 5,259,655 A * | 11/1993 | Anderson | 296/70 |
| 5,282,556 A | 2/1994 | Bossert | |
| 5,418,836 A * | 5/1995 | Yazaki | 455/569.2 |
| D363,916 S | 11/1995 | Johnson | |
| 5,503,565 A * | 4/1996 | McCoy | 439/171 |
| 5,529,271 A * | 6/1996 | Dunchock | 248/205.2 |
| 5,680,974 A * | 10/1997 | Vander Sluis | 224/281 |
| 5,743,585 A * | 4/1998 | Pranger et al. | 296/37.12 |
| 6,048,020 A | 4/2000 | Gronowicz et al. | |
| D425,475 S | 5/2000 | Herer | |
| 6,062,623 A * | 5/2000 | Lemmen | 296/37.8 |
| 6,086,129 A | 7/2000 | Gray | |
| D429,209 S | 8/2000 | Inchaurregui | |
| D429,684 S | 8/2000 | Johnson | |
| 6,123,377 A | 9/2000 | Lecher et al. | |
| D434,365 S | 11/2000 | Herer et al. | |
| 6,176,534 B1 * | 1/2001 | Duncan | 296/37.12 |
| D437,299 S | 2/2001 | Johnson | |
| D438,841 S | 3/2001 | Smith | |
| D443,246 S | 6/2001 | Smith | |
| D443,855 S | 6/2001 | Herer et al. | |
| D447,998 S | 9/2001 | Pfeiffer et al. | |
| D453,318 S | 2/2002 | Moore | |
| 6,388,881 B2 * | 5/2002 | Yamauchi et al. | 361/704 |
| 6,428,072 B1 * | 8/2002 | Moore | 296/24.34 |
| 6,709,041 B1 * | 3/2004 | Hotary et al. | 296/70 |
| 7,165,687 B1 * | 1/2007 | Stevens et al. | 211/86.01 |
| 7,210,725 B2 * | 5/2007 | Moore | 296/37.8 |
| 7,407,210 B2 * | 8/2008 | Arbaugh et al. | 296/24.34 |
| 2005/0035618 A1 * | 2/2005 | Toth et al. | 296/24.34 |
| 2006/0012487 A1 * | 1/2006 | Gibson et al. | 340/815.45 |
| 2009/0072565 A1 * | 3/2009 | Mayne, Jr. | 296/24.34 |

\* cited by examiner

*Primary Examiner* — Kiran B. Patel
(74) *Attorney, Agent, or Firm* — Charles J. Rupnick

(57) ABSTRACT

A reconfigurable vehicle console system having a plurality of interchangeable side panels of different lengths. The system also includes a plurality of interchangeable blank and equipment mounting face plates and quick disconnect clamps associated with each panel.

7 Claims, 4 Drawing Sheets

MODULAR CONSOLE SYSTEM

This application is a Continuation-in-part patent applications Ser. No. 12/287,622 filed in the name of the same inventor on Oct. 10, 2008 now U.S. Pat. No. 7,802,832, which is incorporated herein by reference.

FIELD OF THE INVENTION

The present invention relates to vehicle consoles and in particular to one that provides novel reconfigurable equipment mounting features, the console being mountable within a vehicle driver compartment to support equipment in a location easily accessible to a driver of the vehicle.

BACKGROUND OF THE INVENTION

Police officers, public safety officers, firefighters, paramedics and the like carry various types of equipment in their vehicles. Several pieces of equipment are often carried in a single vehicle, and the driver often needs to operate the equipment while simultaneously driving the vehicle. Thus, various devices exist to secure multiple pieces of equipment within a vehicle so that they are accessible to the driver and/or other persons in the vehicle driver compartment.

These devices commonly include a hollow rectangular box situated on the floor of the vehicle between the driver seat and front passenger seat, including a horizontal top portion having an upwardly facing opening for receiving pieces of equipment. Police cruisers, for example, are commonly fitted with equipment boxes of this type. The boxes are used to house various types of equipment and controls used by police officers, such as radios, siren controls and light bar controls. Typically, the boxes are sized and positioned so that most of the box extends between the driver seat and the front seat. Only a small portion, if any, of the box will extend forward toward the dashboard beyond the driver seat and front passenger seat. In some police cruisers, the equipment box extends all the way back to the prisoner partition separating the rear seating area from the driver compartment. A laptop computer is often positioned between the box and dashboard, and is secured to the vehicle floor with various types of mounting hardware.

Systems employing the conventional equipment box described above suffer from a number of problems associated with the structure of the box. It is generally well known that consoles of the prior art are manufactured in fixed lengths so that changing the console's length requires buying a whole new console.

Furthermore, face plates of known consoles are custom designed to match a specific portion of the console's side wall, whereby equipment must be mounted in a prescribed position on the console. Also, custom design of the face plates includes design for specific pieces of equipment so that many different face plates must be manufactured and stocked. The conventional equipment box configuration described above makes it more difficult to remove a piece of equipment from this box, or reposition the piece of equipment on the console.

SUMMARY OF THE INVENTION

The present invention is a reconfigurable vehicle console having side panels of different length that can be interchanged to lengthen or shorten the console. The present invention also includes a plurality of interchangeable face plates for mounting equipment, the face plate further being moveable to different positions along the console.

According to one aspect of the reconfigurable vehicle console is formed of a pair of end panels and a pair of side panels interconnectable with the pair of end panels. A plurality of face plates each have portions thereof that are interconnectable with a respective one of the pair of side panels. A plurality of connectors are operable for securing each of the face plates to a respective portion of each of the side panels.

According to another aspect of the reconfigurable vehicle console, the reconfigurable vehicle console also includes at least two of the pairs of side panels, the two pairs of side panels having different lengths.

According to another aspect of the reconfigurable vehicle console, at least one of the plurality of face plates is further positionally interchangeable with a different one of the face plates A plurality quick release clamps make the face plates easily removable and interchangeable.

According to another aspect of the modular console system, a method of configuring a reconfigurable vehicle console is provided, the method including: providing first and second substantially rigid end panels; interconnecting a pair of substantially rigid side panels with the first and second end panels; providing a plurality of face plates each having portions thereof that are matable with each of the side panels; mating the matable portions of the plurality of face plates with each of the side panels; and securing each of the face plates to each of the side panels.

According to another aspect of the method of the modular console system, the method further includes providing a first pair of side panels having first length, and a second pair of side panels having a second length different from the first length; and selecting between the first and second pairs of side panels for interconnecting with the first and second end panels.

According to another aspect of the method of the modular console system, the method of securing each of the face plates to each of the side panels further includes operating a quick release connector.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings which all show different views of the same novel reconfigurable vehicle console system shown in FIG. 1, wherein.

DETAILED DESCRIPTION OF PREFERRED EMBODIMENT

In the Figures, like numerals indicate like elements.

Figure 1:
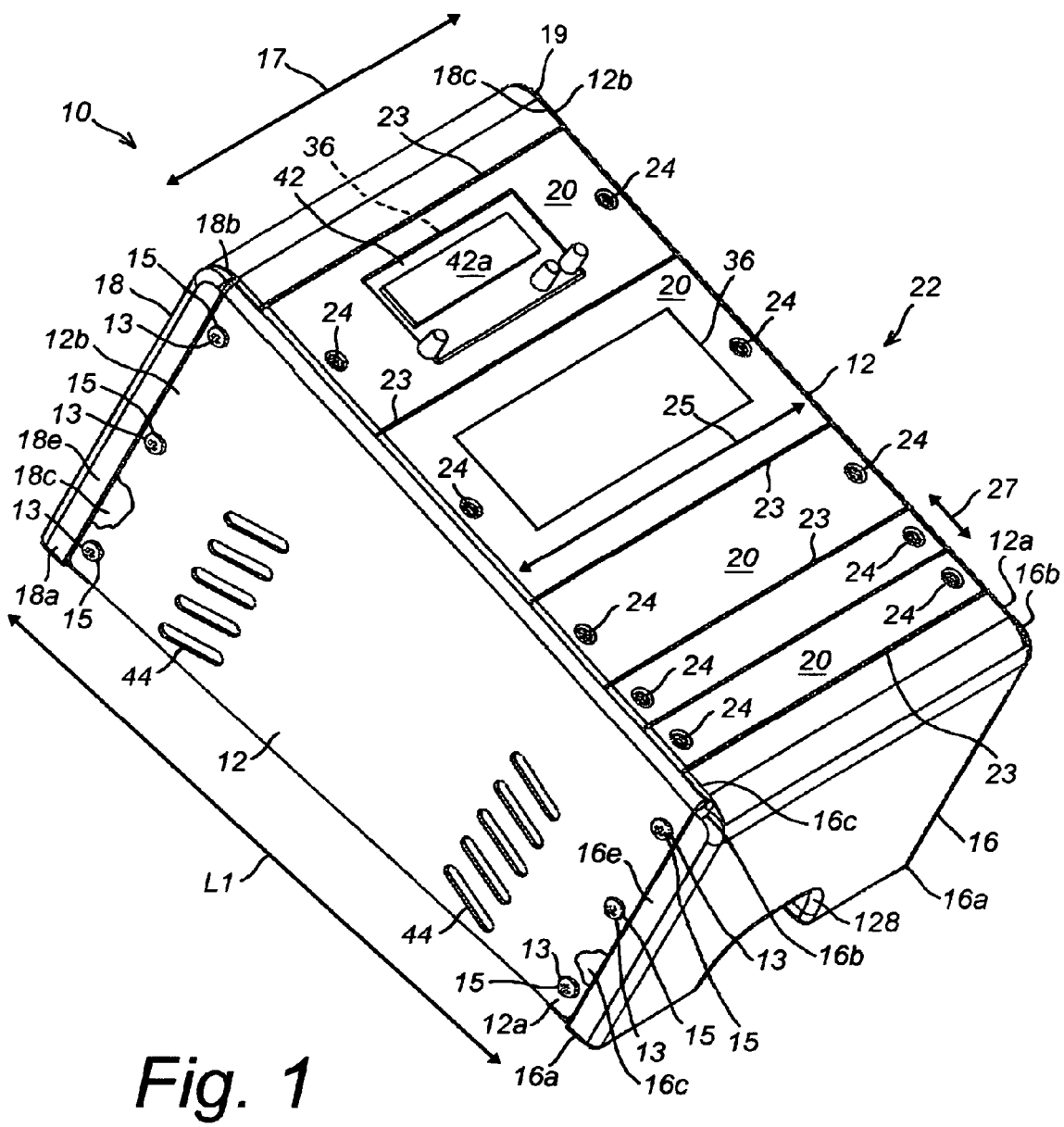
FIG. 1 is a perspective view showing an example of the novel reconfigurable vehicle console system as viewed from a first end.

FIG. 1 is a perspective view that illustrates a novel reconfigurable vehicle console 10 having a pair of opposing substantially rigid side panels 12 and opposing substantially rigid end panels 16 and 18. Clearance recesses 128 for the vehicle's drive line hump (not shown) in front-engine, rear-wheel drive automobiles is optionally provided in the end panels 16, 18. The end panels 16, 18 are formed with opposing side edge mounting surfaces 16c and 18c, respectively, shown in partial break away of side panels 12. The edge mounting surfaces 16c, 18c of the end panels 16, 18 are substantially rigidly interconnected between end connection portions 12a and 12b, respectively, of the two side panels 12. Optionally, the side edge mounting surfaces 16c, 18c are relieved by about the thickness of the side panels 12 such that end connection portions 12a, 12b of respective side panels 12 are approximately flush mounted with portions 16e and 18e of respective end panels 16 and 18 exposed by the side panels 12.

The first end connection portions 12a of two side panels 12 extend substantially from a base 16a of the first end panel 16 to its crown 16b. The second end connection portions 12b of two side panels 12 extend substantially from a base 18a of the second end panel 18 to its crown 18b. The end connection portions 12a, 12b of two side panels 12 and opposing edges of the first and second end panels 16, 18 are each formed with one or more cooperating connection points 13. By example and without limitation, the end connection portions 12a, 12b of the two side panels 12 connect with the opposing edges of the end panels 16, 18 at the connection points 13 by means of connectors 15. The connectors 15 are, for example, threaded fasteners or other removable and interchangeable connectors. The cooperating connection points 13 are formed in substantially identical positions on both the end connection portions 12a, 12b of the side panels 12 and the opposing edges of respective end panels 16, 18. The side panels 12 thus have cooperating connection points 13 and with respective end panels 16, 18. More or fewer connection points 13 are also contemplated and may be included or substituted without deviating from the scope and intent of the present invention.

The end panels 16, 18 are substantially the same width such that the side panels 12 are spaced apart a substantially uniform or constant distance 17 between the end panels 16, 18, thereby forming a substantially rectangular support frame 19.

Furthermore, it is generally well known that consoles of the prior art are manufactured in fixed lengths so that changing the console's length requires buying a whole new console. The method disclosed herein permits any of the original console manufacturer, the distributor, the wholesaler, retailer, installer or end user to change the console 10 to any of several lengths. Accordingly, the console 10 is convertible to different lengths as illustrated in the figures.

Side panels 12 are manufactured in pairs with the pairs having different lengths L that are optionally any desired length L1, L2, L3 through Ln. All side panels 12 have the same first heights for each of the first end connection portions 12a, and the same second heights for each of the second end connection portions 12b. The first end connection portions 12a of side panels 12 connect with the recessed edges 16c of the first end panel 16 at substantially identical connection points 13 using either the same or identical connectors 15. Similarly, the second portions 12b of side panels 12 connect with the recessed edges 18c of the second end panel 18 at substantially identical connection points 13 using either the same or identical connectors 15. Here, the console 10 is illustrated with a pair of side panels 12 of a first length L1 of the different lengths L.

As illustrated herein, different side panels 12 of different lengths L are provided that mate with the opposing first and second substantially rigid end panels 16 and 18. The only effective difference between different side panels 12 of different lengths is the angle of slope of an upper mounting lip 100 to the respective first and second end connection portions 12a and 12b. This variation in the angle of slope of the upper mounting lip 100 for different lengths of the side panel pairs 12 is only provided when the measurement from base 18a to crown 18b of the second end panel 18 is different from the measurement from base 16a to crown 16b of the first end panel 16. Accordingly, regardless of length any pair of side panels 12 of the same length L1, L2, L3 or Ln may be interconnected between first and second end connection portions 12a, 12b of the respective side panels 12. Thus, by changing just a single component, the pair of side panels 12, the console 10 can lengthened or shortened to fit different needs or different vehicles. In the prior art, the user could only change the length of a console by buying an entire new different console. Now, by providing interchangeable pairs of side panels 12 of different length L1, L2, L3 ... Ln the present invention makes it possible to lengthen or shorten the console 10 without buying a whole new console. The present console 10 is a truly modular console system that can be reconfigured for use in different vehicles by just replacing side panels 12, or just reconfigured for use in the same vehicle to accommodate more or fewer pieces of equipment or other utilities.

The side panels 12 are configured for being secured to the drive shaft floor hump of the vehicle using, for example using an interface plate attached to the hump and having a plurality of fastener holes spaced along side flanges arranged along the hump. By example and without limitation, the side panels 12 include a plurality of fastener passages 44 structured as holes or slots (shown) that can be used to secure the console 10 to the interface plate and even orient its upper surface 22 at an angle convenient for the vehicle operator.

A plurality of substantially interchangeable face plates 20 are removably clamped to the side panels 12 of the rectangular support frame 19 between the opposing end panels 16, 18. For example, a plurality of the interchangeable face plates 20 are removably clamped between the side panels 12 for partially forming a top or upwardly facing surface 22 of the console 10 when installed. One or more pair of releasable connectors 24, such as fasteners or releasable clamps, secures each of the face plates 20 to each of the side panels 12. More or fewer of the face plates 20 are utilized depending upon the different optional lengths L of the console side panels 12.

The face plates 20 are all of a substantially uniform length 25 between the side panels 12, but are optionally formed with any useful width between the end panels 16, 18. However, the face plates 20 are optionally of a minimum unit width 27 or an integral multiple of the minimum unit width 27. By example and without limitation, the all of the face plates 20 are either a minimum width 27 of about 1 inch, for example, or an integer multiple of the minimum 1 inch width 27, i.e., 2 inch, 3 inch, 4 inch, etc.

A modern surface mount equipment piece 42, such as a radio, global positioning sensor (GPS), is optionally surface-mounted directly on the outer surface 21 of one of the face plates 20, as by adhesive or mechanical fasteners. Optionally, one or more cutouts 36 are formed in different face plates 20 for receiving there through the equipment piece 42, such as a radio, global positioning sensor (GPS), or siren and light bar controls, that is not of the surface-mount variety, or other control switches. When present, the cutouts 36 are either sized to industry standards for a particular equipment piece 42, else custom sized to match a particular make and model of equipment piece 42. The face plate 20 thus functions as a face plate for the equipment piece 42 being secured thereto, with the cutout 36 functioning as a bezel surrounding an operating face 42a of the equipment piece 42. The cutouts 36 for receiving an equipment piece 42 is substantially the only significant difference between blank face plates 20 and face plates 20 for mounting an equipment piece 42.

Joints 23 are formed between adjacent face plates 20, and additional joints 23 are formed between end ones of the face plates 20 and respective adjacent end panels 16, 18. In contrast to the butt joints typical in prior art consoles, joints 23 are optionally overlapping which causes them to be distinctly more sealed and secure than such butt joints of the prior art. For example, overlapping joints 23 are either lap joints or tongue-and-groove joints.

Figure 2:
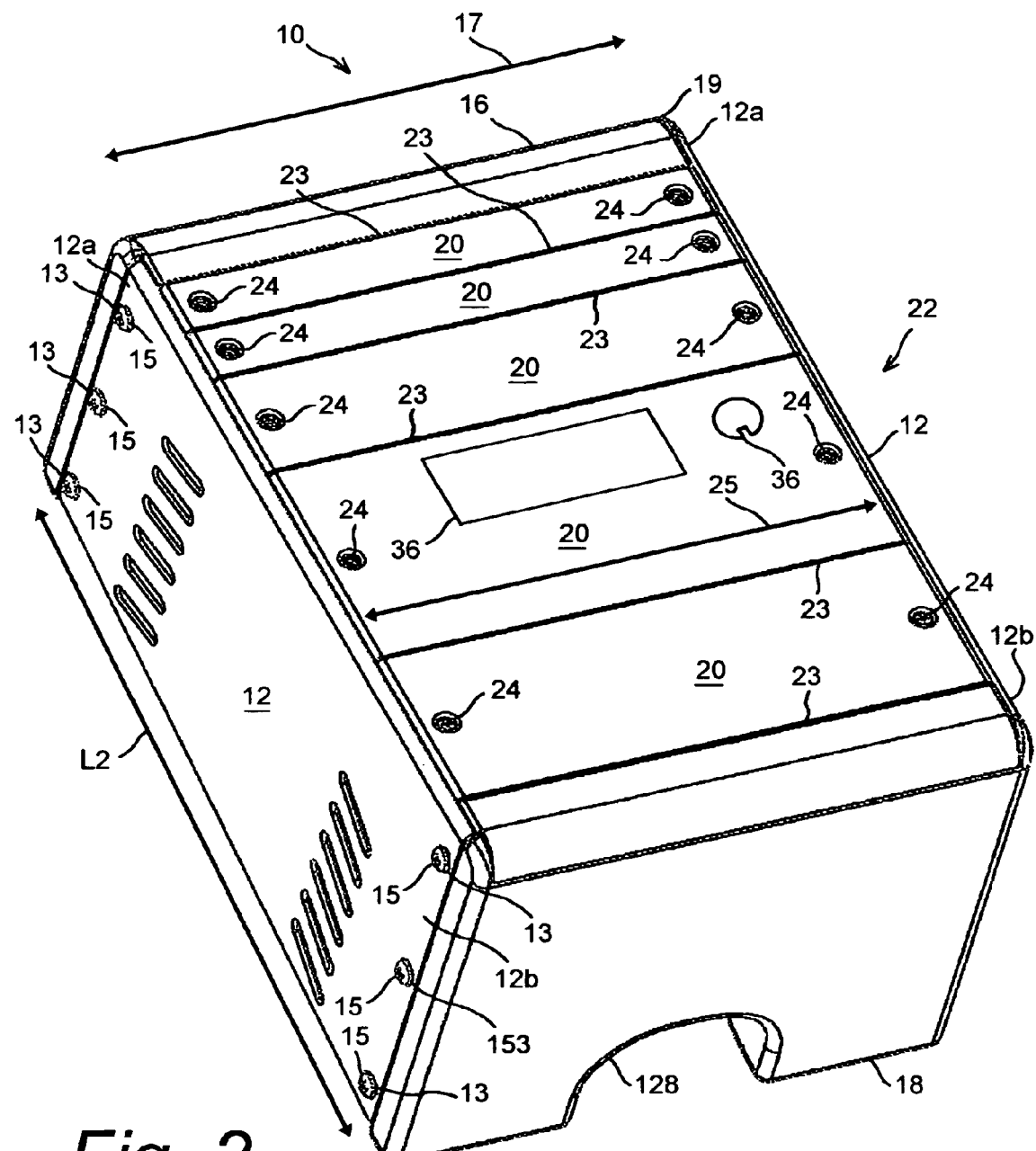
FIG. 2 is a perspective view showing an example of the novel reconfigurable vehicle console system shown in FIG. 1 as viewed from a second end opposite from the first end show in FIG. 1.

FIG. 2 illustrates the novel reconfigurable vehicle console 10 of FIG. 1 viewed from the opposite end panel 18. Here, the console 10 is assembled with a side panel pair 12 having a second length L2 different from the length L1 illustrated in FIG. 1. Accordingly, the length of console 10 is changed by simply changing the side panel pair 12 to a pair having a different length. Second length L2 of side panel pair 12 is optionally longer than length L1 illustrated in FIG. 1. Accordingly, the resulting console 10 is longer, and more of the face plates 20 can be used with the longer side panel pair 12, thereby increasing the utility of console 10.

Figure 3:
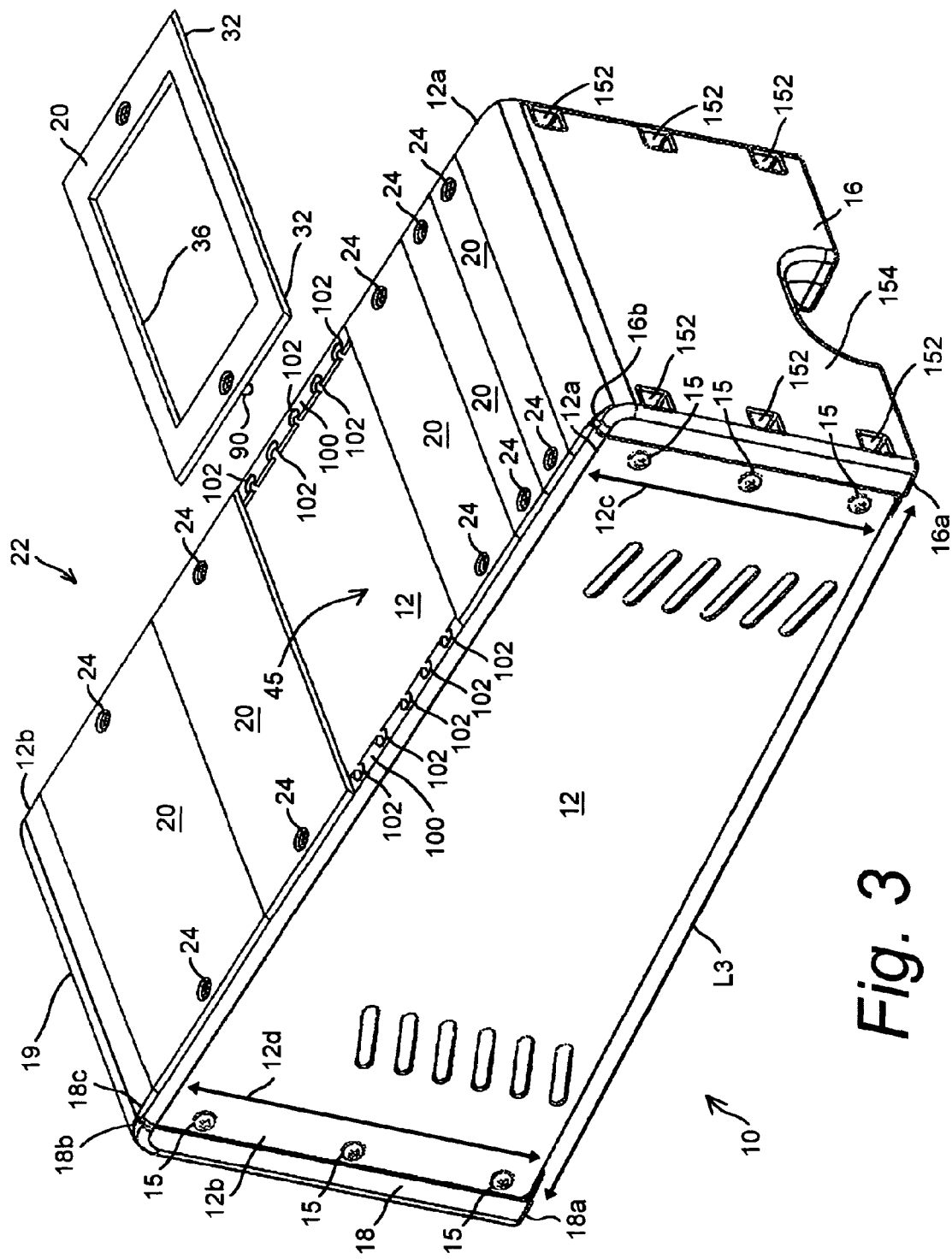
FIG. 3 is a perspective view showing the novel reconfigurable vehicle console system shown in FIGS. 1 and 2 but having a length different from the lengths illustrated in FIGS. 1 and 2.

FIG. 3 illustrates the console 10 is assembled with a side panel pair 12 having a third length L3 different from the length L1 illustrated in FIG. 1 and the length L2 illustrated in FIG. 2. Accordingly, the length of console 10 is changed by simply changing the side panel pair 12 to a pair having a different length L. More face plates 20 can be used with the resultant longer console 10, thereby increasing its utility. However, the shorter console 10 assembled with side panel pairs 12 of shorter length L or L2 may fit easier into more compact vehicle applications.

The figures illustrate the console 10 being convertible to different lengths L, L2 and L3 through Ln. Side panels 12 are manufactured in different lengths, all having the same first heights for each of the first end connection portions 12a, and the same second heights for each of the second end connection portions 12b The first end connection portions 12a of two side panels 12 connect with the edges of the first end panel 16 at substantially identical connection points 13.

Different side panels 12 of any length L1, L2, L3 through Ln mate with opposing end panels 16, 18. Regardless of length L, a height 12c of the end connection portion 12a of each side panel 12 is substantially the same as the height from base 16a to crown 16b of the first end panel 16. Also regardless of length L, height 12d of the end connection portion 12b of each side panel 12 is substantially the same as the height from base 18a to crown 18b of the second end panel 18. The heights 12c, 12d of respective end connection portions 12a, 12b is the same for each side panel 12 of any length L1, L2, L3 . . . Ln. Additionally, the connection points 13 are the same for each side panel 12 regardless of length L. Thus, other than length L, the only effective difference between different side panel pairs 12 of different length L is the angle of slope of the upper mounting lip 100 relative to respective end connection portions 12a, 12b. Accordingly, regardless of length L the end connection portions 12a, 12b of any pair of side panels 12 of the same length L, L2, L3 or Ln may be interconnected between respective end panels 16, 18. Thus, by changing just the single component of the side panel pair 12, the console 10 can lengthened or shortened to fit different needs or different vehicle applications. In the prior art, the user could only change the length of a console by buying an entire different console. Now, by providing interchangeable side panels 12 of different lengths L1, L2, L3 through Ln the present invention makes it possible to lengthen or shorten the console 10 without buying a whole new console. The present console 10 is a truly modular console system that can be reconfigured for use in different vehicles by just replacing side panels 12, or just reconfigured for use in the same vehicle to accommodate more or fewer equipment pieces 42 or other utilities.

According to one embodiment, side nut pockets 152 are also provided in both end panels 16, 18. Side nut pockets 152 align with connection points 13 and hold nuts for engagement by individual connectors 15 for securing side panels 12, 14 to end panels 16, 18. As shown here by example and without limitation, nut pockets 152 may be accessed through an external face 154 of either end panel 16, 18.

FIG. 3 also illustrates installation/removal of one of the face plates 20 from the console 10. As illustrated here by example and without limitation, side panels 12 are each further formed with an upper mounting lip 100 bent at right angles and facing one another inwardly across the console 10. The mounting lips 100 support the face plates 20. Furthermore, the mounting lips 100 are formed with a plurality of apertures 102 spaced there along at substantially uniform intervals. Face plates 20 are secured to mounting lips 100 by pairs of releasable connectors 24.

Optionally, locators are provided between the side panels 12 and each face plate 20. By example and without limitation, opposing side nesting lip portions 32 of each of the face plate 20 is further formed with a button or detent 90 positioned thereon for locating the face plate 20 on the side panels 12 of the console 10. The detents 90 mate with apertures 102 in the mounting lips 100 of opposing side panels 12. By example and without limitation, detents 90 are positioned in about the middle of side nesting lip portions 32. Optionally, more than one of the detents 90 may be provided at intervals along each side nesting lip portion 32. The detents 90 and mating apertures 102 cooperate as locators that position face plates 20 relative to each of side panels 12. Furthermore, the different face plates 20 anchor side panels 12 by means of the detents 90 being substantially interlocked with apertures 102, whereby face plates 20 act as stabilizers between the side panels 12 to stiffen the console 10. Therefore, side panels 12 can be made thinner and lighter without compromising to the overall stiffness and integrity of the console 10.

After the face plate 20 is mated with the console side panels 12, the connectors 24 are installed to releasably retain each face plate 20 relative to the upper mounting lips 100. Subsequently, the different face plates 20 can be removed and interchanged at will to arrange and rearrange the console 10 as desired. More equipment pieces 42 can be accommodated by utilizing more of the face plates 20 having the cutouts 36, or some of the equipment bearing face plates can be replaced with non-equipment bearing or blank face plates 20. Alternatively, the different equipment pieces 42 can be accommodated by utilizing different face plates 20 of different sizes with cutouts 36 sized and shaped to receive the different equipment pieces 42. Additionally, the different face plates 20 can be interchangeably relocated to different positions along the mounting lips 100 of the side panels 12 and detents 90 always mate with appropriate apertures 102 because the face plates 20 are all either the minimum unit width 27 or an integral multiple. Accordingly, in contrast to prior art consoles, the console 10 is truly reconfigurable.

Figure 4:
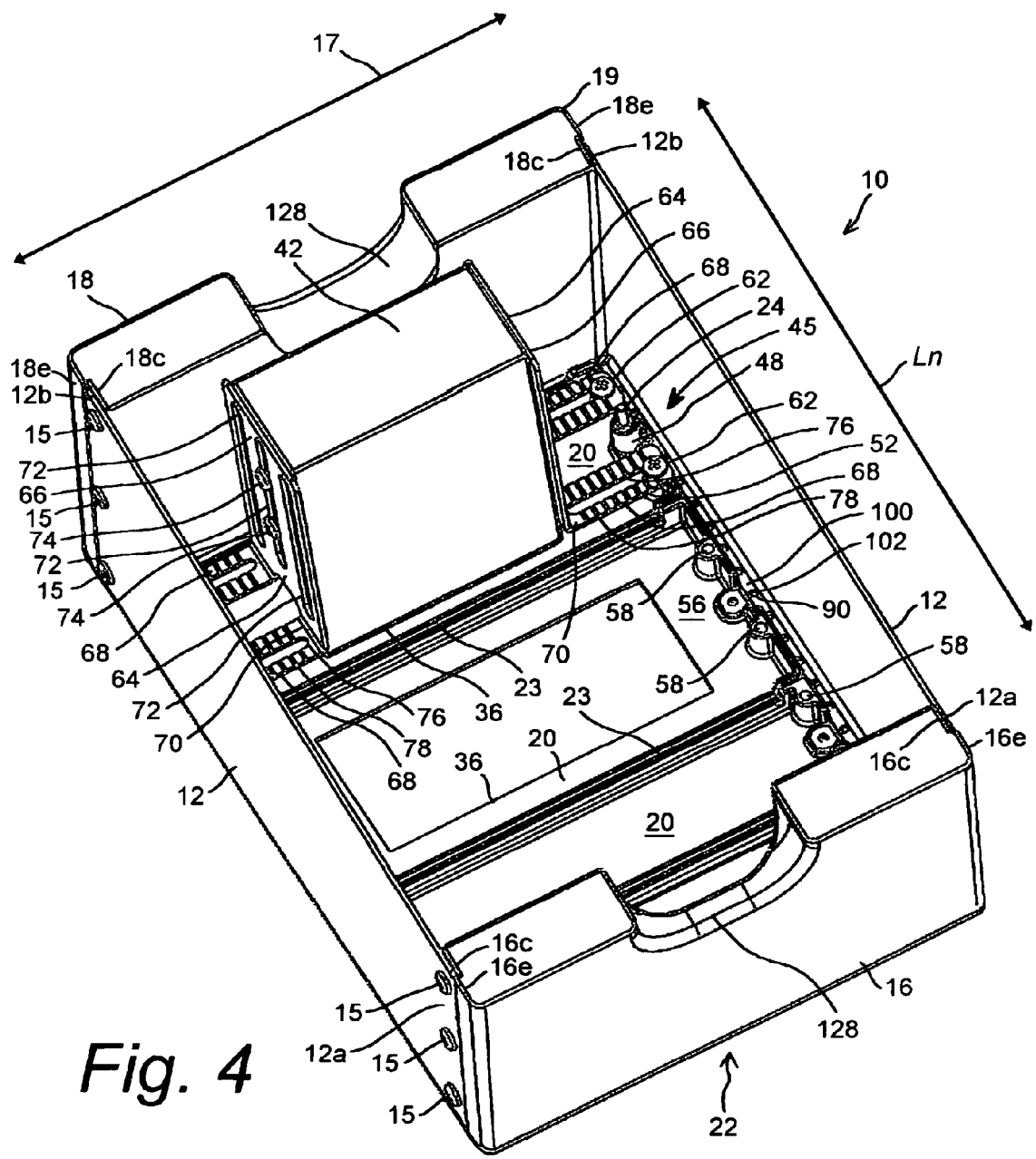
FIG. 4 is a is a perspective view into an interior portion of the novel reconfigurable vehicle console shown in each of FIGS. 1, 2 and 3.

FIG. 4 is a view into an interior portion 45 of the novel reconfigurable vehicle console 10 viewed from the underside opposite from top or upwardly facing surface 22. Here, console 10 is assembled with a side panel pair 12 having a length Ln different from the lengths L1, L2 and L3 illustrated in earlier Figures. Side edge mounting surfaces 16c and 18c of respective end panels 16 and 18 are more clearly illustrated here as being optionally relieved or recessed by about the thickness of side panels 12. Relieved side edge mounting surfaces 16c, 18c permit first and second end connection portions 12a, 12b of respective side panels 12 to lay substantially flush with portions 16e, 18e of respective end panels 16, 18 exposed by side panels 12. As disclosed herein, first and second end connection portions 12a, 12b of respective side panels 12 connect with the opposing mounting edges 16c, 18c of first and second end panels 16, 18 at the connection points 13 by means of connectors 15.

Face plates 20 are secured to the upper mounting lips 100 of the side panels 12 by one or more pair of the releasable connectors 24. The connectors 24 are illustrated here as releasable clamps having a movable jaw portion 48 for engaging or disengaging the upper mounting lips 100 of side panel pairs 12.

When the equipment piece 42 is mounted through a cutout 36, one or more fasteners 62 secure the equipment piece 42 to the face plate 20 through a pair of L-brackets 64. According to one example, the L-brackets 64 are formed of an equipment interface portion 66 and a face plate interface portion 68 that are interconnected by a right angle portion 70. The equipment interface portion 66 is formed with one or more equipment interface slots 72 oriented along its length, and one or more fasteners 74 are utilized for securing the equipment interface portion 66 of each L-bracket 64 to opposite sides of the equipment piece 42.

The face plate interface portion 68 is structured to mount to the face plate 20. For example, the face plate interface portion 68 is formed with a pair of face plate interface slots 76 oriented along its length and positioned to substantially align with a pair of fastener receivers 58 positioned on an interior surface 56 of the face plate 20. The securing fasteners 62 are received through respective face plate interface slots 76 into the fastener receivers 58 for securing the L-brackets to the inner surface 56 of the face plate 20.

Optionally, the face plate interface portion 68 is split into a pair of spaced apart legs, as shown, each containing one of the pair of face plate interface slots 76. A surface of each leg of the face plate interface portion 68 is optionally further scored by a plurality of grooves or other artifacts 78 across the interface slots 76 at substantially regular intervals. The scoring grooves 78 are utilized for breaking the legs of the face plate interface portion 68 to a convenient length to fit between the equipment piece 42 and respective side panels 12. The installer merely assembles the equipment piece 42 within one of the cutouts 36 in the face plate 20 using the pair of L-brackets 64, then cuts or breaks off an excess portion of each leg of the face plate interface portion 68 that extends into either side nesting lip portion 32. By example and without limitation, the legs of the face plate interface portion 68 are broken by metal fatigue that occurs by bending along one of the scoring grooves 78, the legs eventually fatigue and break at the scoring groove 78 by repeated bending back an forth. After the face plate interface portion 68 is sized, the assembly of the equipment piece 42 and equipment face plate 20 fits easily into the space between side panels 12. The breakable legs of the face plate interface portion 68 permit a single one-size-fits-all L-bracket 64 to be manufactured, stocked and supplied with the console 10, in contrast to custom L-brackets to fit each size of cutout 36, as was practiced in the prior art.

Method

Face plates 20 are molded, for example, of an injection moldable plastic, composite or metal material. Face plates 20 are thus manufactured easily and inexpensively as individual units of relatively rigid molded plastic, composite or metal parts. When molded of nylon, plastic or composite material, the face plates 20 remain substantially rigid as well as tough and sturdy but, in contrast to the prior art, are light weight. Furthermore, injection molding permits the formation of side edge contours, such as rounds or bevels, that avoid dangerous sharp edges and generally smooth the contour of the console 10.

According to one embodiment, face plates 20 are all originally manufactured, either by injection molding or another suitable manufacturing process, as blank face plates 20 without any of the cutouts 36. The blank face plates 20 are originally manufactured in several different widths, for example, the minimum width 27 and different multiples of the minimum width 27. Blank face plates 20 are stored until an order is received for either blank or equipment mounting face plates 20. The portion of an order requiring blank face plates 20 of one or more width 27 is filled using off-the-shelf blank face plates 20 of the desired widths. For example, the equipment pieces 42 may be exclusively of the surface mount type discussed herein, whereby the cutout 36 is not necessary for mounting. On the other hand, if an equipment piece 42 requires the cutout 36, the portion of the order requiring equipment mounting face plates 20 with cutouts 36 is filled by retrieving off-the-shelf blank face plates 20 of the desired widths, then forming the one or more cutouts 36 in any size, quantity and location required to satisfy the order. Cutouts 36 are sized in respective blank face plates 20 to receive there through any desired equipment piece 42, such as a radio, global positioning sensor (GPS), or siren and light bar controls, or other control switches. As disclosed herein, cutouts 36 are either sized to industry standards for a particular equipment piece 42, else custom sized to match a particular brand or model of equipment piece 42. Cutouts 36 are either centered in the face plate 20, or custom positioned to satisfy the desired positioning of the equipment piece 42 to be mounted therein.

Cutouts 36 are formed by cutting through the off-the-shelf blank face plate 20. The cutting may be accomplished by any suitable manufacturing method, including drilling, sawing, stamping, milling, for example using numerical controlled (NC) milling equipment, water jet cutting, or laser machining. When the off-the-shelf blank face plates 20 are cast, molded, machined or otherwise formed of a nylon, plastic or composite material, programmable water jet cutting or laser machining are ideal cutting processes for customizing cutouts 36 for multiple equipment face plates 20 or just a single one.

Alternatively, the off-the-shelf blank face plates 20 are cast, molded, machined or otherwise formed of a metal, such as steel or aluminum, or an alloy The utilization of off-the-shelf blank face plates 20 also allows specific positioning of the cutouts 36 in each face plate 20 so that the cutout 36 for the same equipment piece 42 is easily centered in one face plate 20, while the cutout 36 for the same equipment piece 42 is asymmetrically positioned in another face plate 20 for the same or a different order. Nor do the cutouts 36 have to be similarly shaped, a round cutout 36 for a meter or electrical outlet is easily placed beside a square cutout 36 for a radio and a keyhole cutout 36 for a switch or dial or yet an irregular cutout 36 for a proprietary equipment piece 42. A speaker grille cutout 36 and associated fastener hole cutouts 36 can be cut into off-the-shelf blank face plates 20 as easily as a rectangular cutout 36 for a standard radio equipment piece 42. The forming of the cutouts 36 thereby transforms any number of off-the-shelf blank face plates 20 into equipment mounting face plates 20 that are either standardized or customized to receive a selected equipment piece 42. The forming of the cutouts 36 is optionally accomplished by the original manufacturer of the off-the-shelf blank face plates 20, else by any of the distributor, the wholesaler, retailer, installer or end user of the console 10. For example, the distributor, the wholesaler, retailer, installer or end user of the console 10 can form the cutouts 36 in the blank face plate 20 by sawing or drilling using conventional home shop tools. Alternatively, the original manufacturer may partially form one or a series of cutouts 36 in the face plate 20, for example by cutting from the interior surface 56 thereof part way through the face plate thickness to the outer surface 21.

When forming of the cutouts 36 is accomplished by the original manufacturer of the off-the-shelf blank face plates 20, the resulting equipment mounting face plates 20 are bundled with the first and second end panels 16, 18, and a pair of side panels 12 of desired length. The bundle optionally includes one or more blank face plates 20 to fill any space on the upper surface 22 of the console 10 left empty by the equipment mounting face plates 20. Such bundling is also contemplated by any of the distributor, wholesaler, or retailer of the console 10.

This process of forming and storing blank face plates 20 of a few or several integer widths 27, then transforming the off-the-shelf blank face plates 20 into equipment mounting face plates 20 by forming therein cutouts 36 of desired size and shape and bundling the resulting equipment mounting panels 30 with pairs of end panels 16, 18 and side panels 12 and, optionally, one or more one or more blank face plates 20 to form a custom console 10 results in a truly modular console system that: 1) minimizes inventory, 2) permits filling of large or small orders for different configurations of blank face and equipment mounting face plates 20 with custom cutouts 36, and 3) permits forming any size cutout 36 to fit different equipment pieces 42 of any size or shape and quantity.

Furthermore, as discussed herein consoles of the prior art are manufactured in fixed lengths so that changing the console's length requires buying a whole new console. The method disclosed herein permits any of the original console manufacturer, the distributor, the wholesaler, retailer, installer or end user of the console 10 to change the console 10 to any one of several lengths L1, L2, L3 through Ln.

Accordingly, as illustrated in the Figures, the method of configuring a reconfigurable vehicle console includes: providing the first and second substantially rigid end panels 16, 18, and interconnecting the pair of substantially rigid side panels 12 with the end panels 16, 18. The end panels 16, 18 are substantially the same width such that the side panels 12 are spaced apart by substantially uniform or constant distance 17 between the end panels 16, 18, so that a substantially rectangular support frame 19 is thus formed. Then providing a plurality of the face plates 20 that are each matable with each of the first and second side panels 12 as disclosed herein.

The method further includes providing at least a first pair of side panels 12 having any length L1, L2, L3 . . . Ln, and a second pair of side panels 12 having a second length L1, L2, L3 . . . Ln that is different from the first length. Optionally, an additional pair of side panels 12 is provided having yet another length L1, L2, L3 . . . Ln that is different from both the first and second lengths. Then, any of the original console manufacturer, the distributor, the wholesaler, retailer, installer or end user of the console 10 selects between the different pairs of side panels 12 of the different lengths L1, L2, L3 . . . Ln for interconnecting with the end panels 16, 18. Additionally, the end connection portions 12a of both side panels 12 connect with the opposing edge surfaces 16c of the first end panel 16 at the connection points 13 by means of connectors 15. The second end connection portions 12b of both side panels 12 connect with the opposing edge surfaces 18c of the second end panel 18 at the connection points 13 by means of connectors 15. Furthermore, as disclosed herein, the connectors 15 are, for example, threaded fasteners or other removable and interchangeable connectors. Therefore, the end user can remove the connectors 15, switch out one set of side panels 12 of length L for a different set of side panels 12 having a second length L that is different from the first length. The new side panels 12 are installed using the same or new connectors 15, and the console 10 is now a different length.

While the preferred and additional alternative embodiments of the invention have been illustrated and described, it will be appreciated that various changes can be made therein without departing from the spirit and scope of the invention. Therefore, it will be appreciated that various changes can be made therein without departing from the spirit and scope of the invention. Accordingly, the inventor makes the following claims.

What is claimed is:

1. A reconfigurable modular console system, comprising:
   a pair of end panels;
   a pair of side panels each formed with opposing end connection portions each of different lengths, the end connection portions of the pair of side panels being removably interconnectable with the pair of end panels; and
   a plurality of face plates each comprising portions thereof interconnectable with a respective one of the pair of side panels; and
   a plurality of connectors operable for securing each of the face plates to a an upper mounting lip of each of the side panels.

2. The console of claim 1, further comprising at least two of the pairs of side panels, a first pair of the two pairs of side panels comprising a first length, and a second pair of the two pairs of side panels comprising a second length, wherein both pairs of side panels are interchangeable and interchangeably interconnectable with the pair of end panels and for having the plurality of face plates being interconnectable therewith.

3. The console of claim 2, further comprising a plurality of connection points between side mounting portions of the end panels and end connection portions of each of the side panels of the two pairs of side panels.

4. The console of claim 3 wherein the side mounting portions of at least one of the end panels further comprises a recessed side mounting portion that is relieved relative to an unrelieved portion thereof that is adjacent thereto.

5. The console of claim 1 wherein each side panel further comprises an upper mounting lip structured for interconnecting with each of the face plates,
   wherein a spacing between the upper mounting lips of the side panels is substantially constant.

6. The console of claim 5, further comprising a locator between each of the face plates and at least one of the side panels.

7. The console of claim 1 wherein at least one or more of the plurality of face plates is further positionally interchangeable with a different one or more of the face plates.

* * * * *